June 21, 1938.  F. C. STONE  2,121,107

TRAP NEST

Filed Feb. 26, 1936

INVENTOR
Fred C. Stone
BY Thomas Bilyeu
ATTORNEY

Patented June 21, 1938

2,121,107

UNITED STATES PATENT OFFICE 2,121,107

TRAP NEST

Fred C. Stone, Corvallis, Oreg.

Application February 26, 1936, Serial No. 65,874

1 Claim. (Cl. 119—49)

The general object of my invention is to provide means for closing the entry door when the hen enters the laying nest to thereby provide a closed chamber in which the hen may lay her egg without molestation from other hens entering the nest during the laying process.

A further object of my invention is to provide a nest whereby the hen may open the door after the laying process and in which condition the door will remain open until another hen enters the laying nest.

My invention is composed of a chamber having a tiltable laying nest disposed therein and having an entry door disposed at one end with the door being so balanced as to normally remain open. The entry door is hingedly secured to one side of the laying nest. When the hen enters the laying nest the weight of the hen counter-balances the door and causes the same to rise thereby closing the entry way to prevent other hens entering the laying nest during its occupancy by the laying hen. This prevents the breaking of the eggs within the laying nest due to the fighting of the hens in the laying chamber during the laying process and also provides automatic means for the laying hen opening and closing the door to the enclosure.

I am aware that trap nests have heretofore been provided having automatic means for the opening and closing of the nest chamber but I am not aware that means have been provided embodying the mechanical construction that I employ to accomplish this result.

A still further object of my invention consists in providing a trap nest in which a platform extends outwardly from the laying chamber to facilitate the entry of the hen into the laying chamber.

A still further object of my invention consists in so constructing the door that it may be used as a hatching nest and during the hatching period instrumentalities are provided for maintaining the setting hen within a relatively closed chamber except at specified intervals, and finally I provide manually manipulative means whereby the nest may be made a trap nest, to lock the hen in the nest after her entry therein.

With these and incidental objects in view, the invention consists in certain novel features of construction and combination of parts, the essential elements of which are set forth in the appended claim, and a preferred form of embodiment of which is hereinafter shown with reference to the drawing which accompanies and forms a part of this specification.

In the drawing.

Like reference characters refer to like parts throughout the several views.

Figure 1:
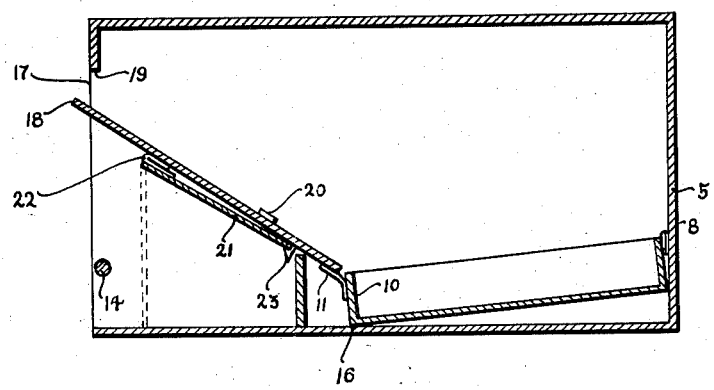
Fig. 1 is a sectional side view of the assembled device. In this view the front door is shown raised.
Figure 2:
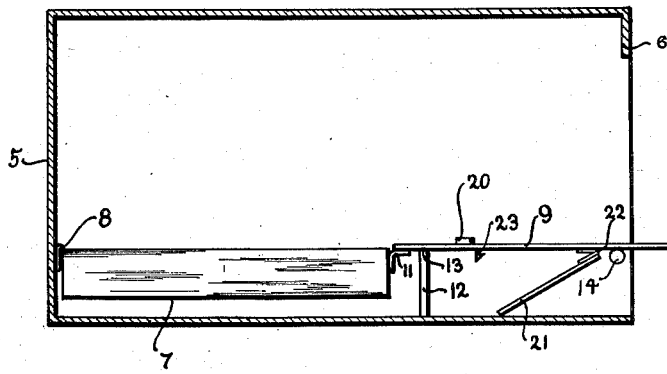
Fig. 2 is a sectional side view of the assembled device. In this view the door is shown open and the laying nest raised.
Figure 3:
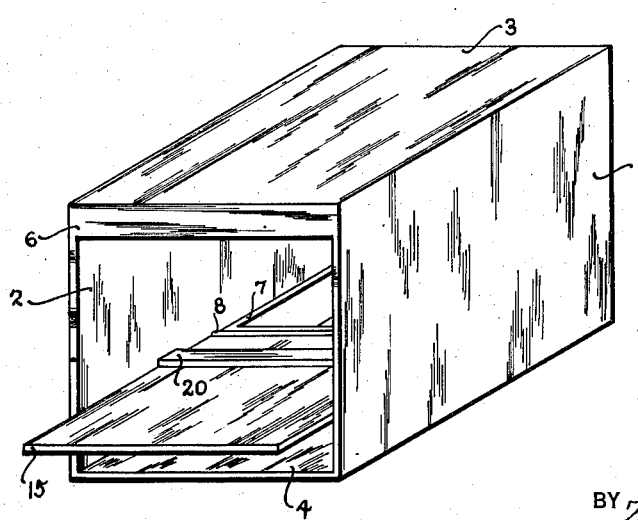
Fig. 3 is a perspective end view of the assembled device illustrating the door in lowered position.

I provide an enclosure having side walls 1 and 2 and having a top 3 and a bottom 4 and a rear wall 5. This provides a rectangular box-like structure that forms a compartment in which a laying hen may be accommodated. A ledge 6 at the entry end of the enclosure extends downwardly from the top and across the front of the compartment and it is secured to the top 3 and to the side walk 1 and 2. I provide a laying nest 7. The laying nest 7 is hingedly secured at its rear end about a hinge support 8 that is secured to the rear wall 5 of the laying compartment.

The laying nest may be made of any suitable material. An entry door 9 is hingedly secured to the front wall 10 of the laying nest and the laying nest and the front door are hingedly secured together by any suitable hinge strap 11.

I place a door support 12 transversely of the laying chamber and I place the door support 12 in front of the laying nest so that the door 9 rests upon the rounded top 13 of the door support. A stop 14 is disposed upon the inside of the side walls so that when the door 9 is hinged downwardly it counter-balances the weight of the laying nest and raises the laying nest so that the bottom of the same will be substantially horizontal. The front end 15 of the door extends outwardly from the front of the laying chamber to form a platform upon which the hen perches herself before her entry into the laying nest. When the hen steps upon the laying nest it will be hinged downward as illustrated in Fig. 1 and simultaneously therewith the door is raised so that the laying hen is then isolated within the laying chamber. The front wall 16 of the laying nest engages the bottom 4 and limits the upward movement of the outer end 18 of the door to thereby leave a ventilating and light crack 17 between the end 18 and the downwardly extending ledge 6.

I place one or more cross cleats 20 upon the top side of the door to facilitate the hen leaving the nest in climbing the inclined slope of the door when the door is in raised position. The weight of the door counter-balances the laying nest to normally maintain the same raised and the door open in its normal position.

In order to isolate the laying hen within the chamber when the same is being used as a setting nest I provide a strut 21. The strut 21 is hinged to the front door 9 by a hinge strap 22. The strut 21 may be held inoperative by a locking latch 23. Upon unlatching the locking latch 23 from the strut 21 the strut is free to hinge downwardly through the action of gravity in which position it occupies the position illustrated in dotted line in Fig. 1. When the door is raised the strut 21 drops down and locks the hen in the enclosure in which position she is held for counting or for setting until the strut is manually released.

While the form of mechanism herein shown and described is adapted to fulfill the objects primarily stated, it is to be understood that it is not intended to confine the invention to the embodiment herein shown and described, as it is susceptible of embodiment in various forms, all coming within the scope of the claim which follows.

What I claim is:

In a device of the class described, the combination of an enclosure being normally open on one of its ends, a laying nest hingedly disposed in the enclosure, a door hingedly secured to the laying nest, a support disposed transversely of the enclosure, the underside of said door resting upon the support and disposed so that the door counter-balances and raises the nest, a stop disposed in the line of travel of the door to limit the downward movement of the door, a strut hingedly secured to the underside of the door and manually manipulative means for rendering the strut inoperative.

FRED C. STONE.